US008843930B2

(12) United States Patent
George et al.

(10) Patent No.: US 8,843,930 B2
(45) Date of Patent: Sep. 23, 2014

(54) THREAD SCHEDULING AND CONTROL FRAMEWORK

(75) Inventors: Midhun Mathew George, Quebec (CA); Vladimir Kudryavtsev, Quebec (CA)

(73) Assignee: SAP AG, Walldorf (DE)

( * ) Notice: Subject to any disclaimer, the term of this patent is extended or adjusted under 35 U.S.C. 154(b) by 272 days.

(21) Appl. No.: 13/545,182

(22) Filed: Jul. 10, 2012

(65) Prior Publication Data

US 2014/0019980 A1  Jan. 16, 2014

(51) Int. Cl.
*G06F 9/46* (2006.01)
(52) U.S. Cl.
USPC .......................................... 718/102; 718/100
(58) Field of Classification Search
None
See application file for complete search history.

(56) References Cited

U.S. PATENT DOCUMENTS

| | | | | |
|---|---|---|---|---|
| 5,748,882 A | * | 5/1998 | Huang | 714/47.3 |
| 6,457,063 B1 | * | 9/2002 | Chintalapati et al. | 719/317 |
| 6,480,877 B1 | * | 11/2002 | O'Donnell et al. | 718/100 |
| 6,865,739 B1 | * | 3/2005 | Bourgeois, III | 718/101 |
| 7,644,130 B2 | * | 1/2010 | Magro et al. | 709/208 |
| 8,448,170 B2 | * | 5/2013 | Wipfel et al. | 718/1 |
| 8,670,972 B1 | * | 3/2014 | Varman et al. | 703/24 |
| 2011/0296419 A1 | | 12/2011 | Dumas et al. | |

OTHER PUBLICATIONS

Internet article, "CRM Middleware Survival Guide," last edited on Aug. 26, 2011. SAP Community Network Wiki.
Internet article, "CRM Middleware Monitoring Cockpit—The Place to be for the CRM Middleware Admin," last edited on Dec. 23, 2010. SAP Community Network Wiki.
Internet article, "HP OpenView Operations, ActiveBatch Job Scheduler," printed Jun. 13, 2012 from http://www.advsyscon.com/products/activebatch/openview.asp.

* cited by examiner

*Primary Examiner* — Kenneth Tang
(74) *Attorney, Agent, or Firm* — Fountainhead Law Group PC

(57) ABSTRACT

Embodiments relate to systems and methods for thread control and scheduling. According to a particular embodiment, a daemon framework provides a uniform approach for scheduling and execution of inter-related processes. The daemon framework may comprise a main daemon configured to manage lifecycle, to manage status, and to control child daemon(s) responsible for functions such as scanning of folders and Persistent Staging Areas (PSAs) for delivery of new data threads. Embodiments may allow visualization of process status, as well as controlling each of these processes. Embodiments may provide for programmatical and/or manual intervention, including error correction. Particular embodiments may have self-correction capability in the case of external or internal errors.

15 Claims, 6 Drawing Sheets

THREAD SCHEDULING AND CONTROL FRAMEWORK

BACKGROUND

Embodiments of the present invention relate to thread scheduling, and in particular, to a thread scheduling and controlling framework capable of auto-restart.

Unless otherwise indicated herein, the approaches described in this section are not prior art to the claims in this application and are not admitted to be prior art by inclusion in this section.

Controlling frameworks as presently used, are generally built for side-by-side implementation. This is done to prevent a conventional framework from being disabled by application error.

However, such a side-by-side implementation makes it difficult for both the application and the framework to know status of each other. In addition, this conventional approach renders cumbersome, the development of additional detection functionality within the framework.

Accordingly, the present disclosure addresses these and other issues with a thread scheduling and controlling framework.

SUMMARY

Embodiments relate to systems and methods for thread control and scheduling. According to a particular embodiment, a daemon framework provides a uniform approach for scheduling and execution of inter-related processes. The daemon framework may comprise a main daemon configured to manage lifecycle, to manage status, and to control child daemons responsible for functions such as scanning of folders and Persistent Staging Areas (PSAs) for delivery of new data. Embodiments may allow visualization of process status, as well as controlling each of these processes. Embodiments may provide for programmatical and/or manual intervention, including error correction. Particular embodiments may have self-correction capability in the case of external or internal errors An embodiment of a computer-implemented method comprises providing a daemon framework comprising a controller daemon and a child daemon, causing the controller daemon to manage a status of the child daemon to automatically scan for delivery of a data thread to a process flow controller, and causing the controller daemon to perform a health check to determine operation of the child daemon. Where the health check indicates that the child daemon is not running, the controller daemon is caused to start the child daemon.

An embodiment of a non-transitory computer readable storage medium embodies a computer program for performing a method comprising providing a daemon framework comprising a controller daemon and a child daemon, causing the controller daemon to manage a status of the child daemon to automatically scan for delivery of a data thread to a process flow controller, and causing the controller daemon to perform a health check to determine operation of the child daemon. Where the health check indicates that the child daemon is not running, the controller daemon is caused to start the child daemon.

An embodiment of a computer system comprises one or more processors, and a software program executable on said computer system. The software program is configured to provide a daemon framework comprising a controller daemon and a child daemon, to cause the controller daemon to manage a status of the child daemon to automatically scan for delivery of a data thread to a process flow controller, and to cause the controller daemon to perform a health check to determine operation of the child daemon. Where the health check indicates that the child daemon is not running, the controller daemon is caused to start the child daemon.

In some embodiments the data thread is delivered to an application folder.

According to certain embodiments the data thread is delivered to a persistent staging area.

In particular embodiments, the child daemon is instantiated according to a singleton pattern using a class factory to manage live instances.

According to some embodiments, the controller daemon may manage a status of the child daemon to be manually interrupted.

In various embodiments, prior to managing a status of the child daemon, the controller daemon may be configured to check a status of the child daemon for consistency.

According to particular embodiments, prior to checking the status of the child daemon for consistency, the controller daemon may be configured to determine a uniqueness.

The following detailed description and accompanying drawings provide a better understanding of the nature and advantages of particular embodiments.

DETAILED DESCRIPTION

Described herein are techniques for thread scheduling and control. The apparatuses, methods, and techniques described below may be implemented as a computer program (software) executing on one or more computers. The computer program may further be stored on a computer readable medium. The computer readable medium may include instructions for performing the processes described below.

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Embodiments bring a control framework to the same system where applications run. Embodiments may also feature an ability to self-restore and eliminate deficiencies without creating a high risk of losing operability in cases except total system shutdown.

Figure 1:
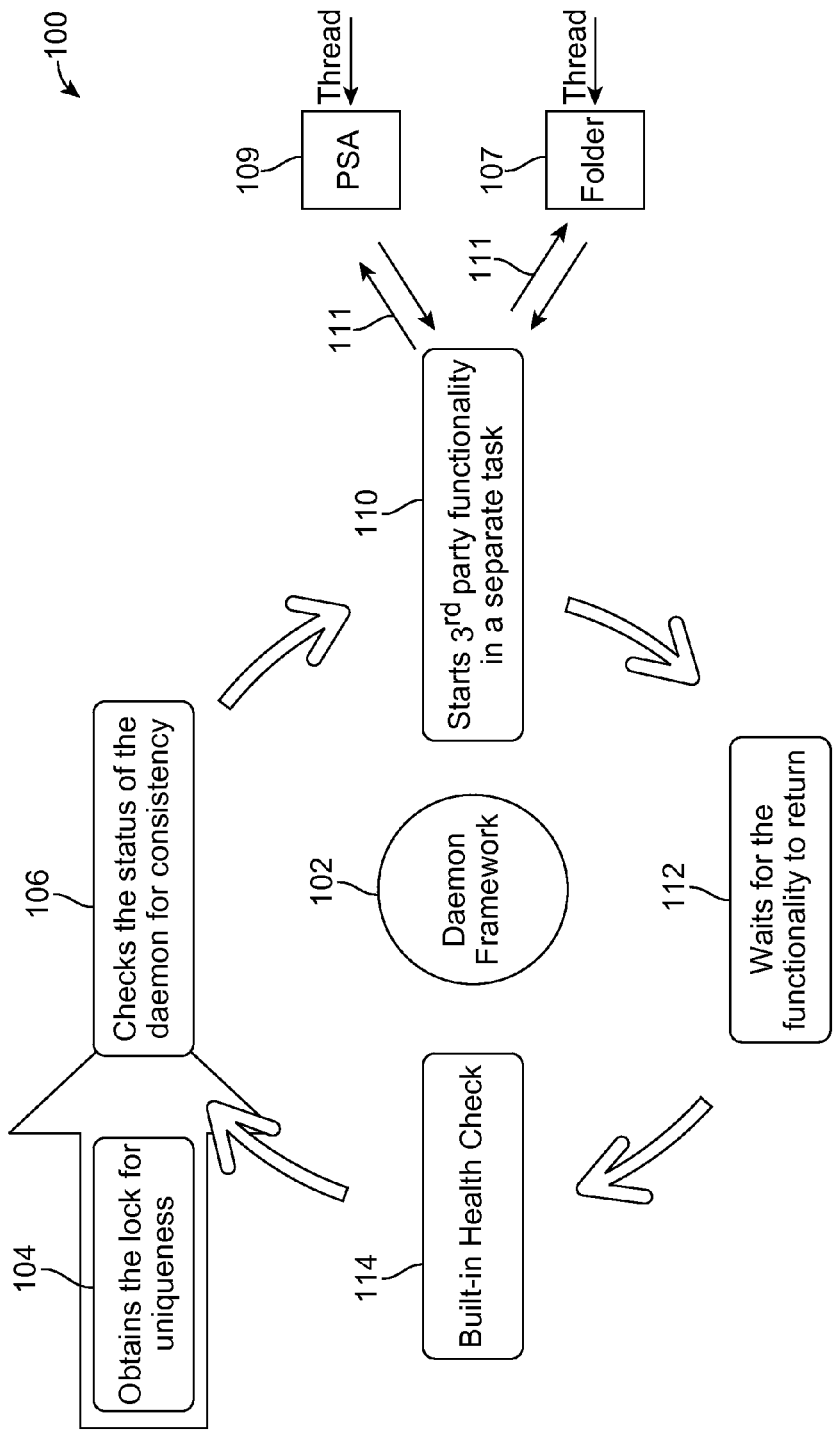
FIG. 1 is a simplified schematic view showing the role of a daemon framework as used in thread control and processing according to an embodiment.
Figure 1A:
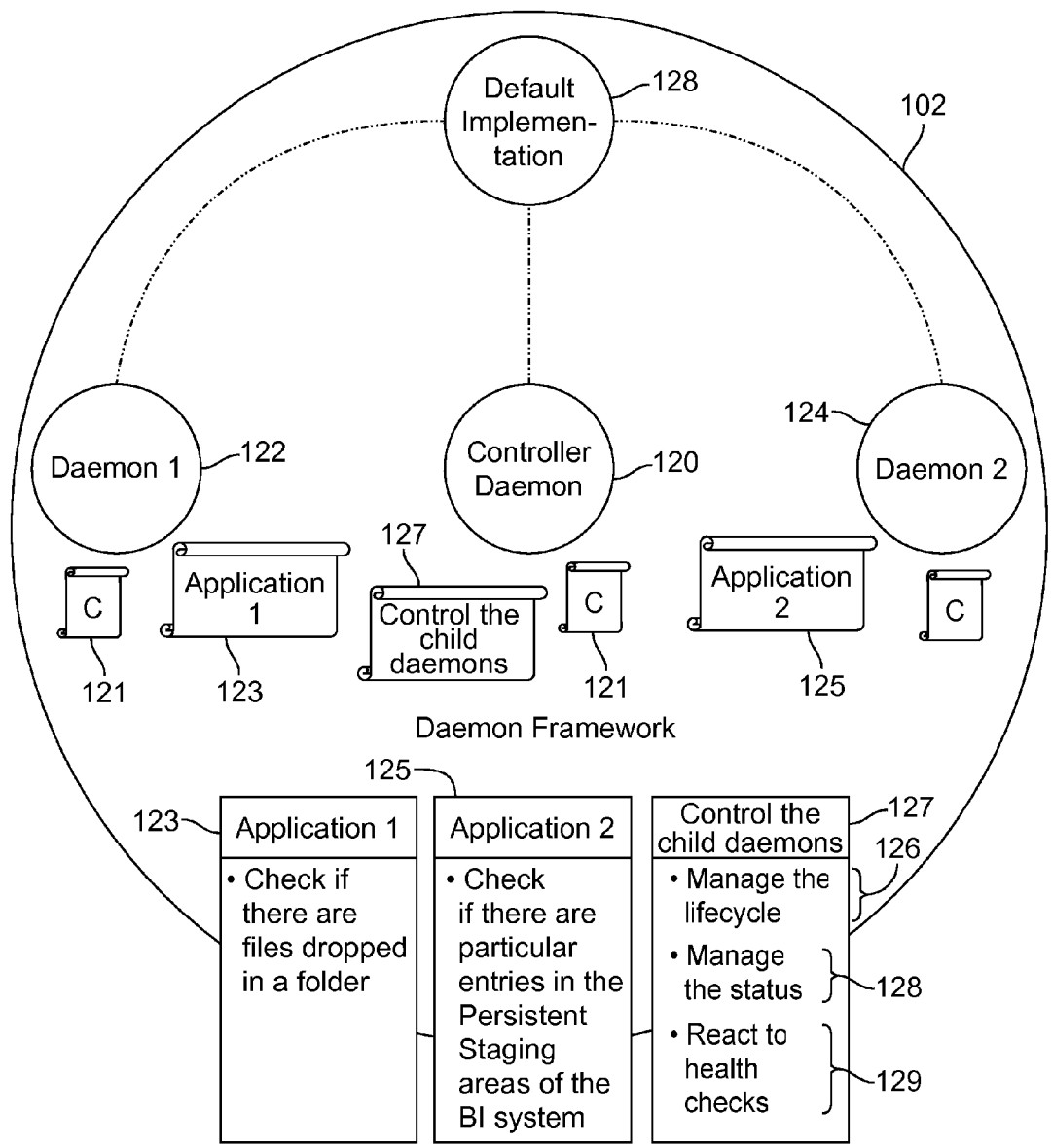
FIG. 1A shows an enlarged view of an embodiment of the daemon framework of FIG. 1.

FIG. 1 shows a simplified view of a processing environment 100 including a daemon framework 102 as used in thread control and processing according to an embodiment. FIG. 1A shows an enlarged view of an embodiment of the daemon framework of FIG. 1.

The environment and framework of FIGS. 1 and 1A respectively, address a user case where a customer needs to detect data delivered periodically by files or table entries. Data processing is considered decoupled from data detection.

The processing environment is summarized in the following table:

| Daemon | Task | Application |
|---|---|---|
| Controller | Manages the scheduling, statuses, and life cycle of the daemons defined in the framework. | Daemon Framework |
| Daemon 1: Folder Scanner | Detecting data in the pre-configured inbound folders. | Load Manager |
| Daemon 2: PSA Scanner | Detecting data deliveries in the pre-configured service PSA. | Load Manager |
| Dispatcher | Detecting deliveries that are to be processed and triggering the actual extraction and processing of data by the Process Flow Controller (PFC) | Process Flow Controller |

In a first action 104, a lock for uniqueness is obtained. Specifically, a first level comprises a uniqueness lock. When a daemon starts running, a lock is obtained which will remain throughout the lifetime of the daemon. This lock in the ENQUEUE server will ensure that the daemon run will be unique throughout the system.

A second level comprises a consistency lock. Thus in a second action 106, the status of the daemon is checked for consistency.

Specifically, although the daemon run is unique, invocation of the daemon could be triggered from multiple applications, including manually or automatically by the scheduler. A consistency lock may be made during the status change of the daemon to ensure consistency.

A third level comprises an integrity lock. As described in connection with the next action 110, main functionality such as scanning of a folder 107 and/or persistent staging area (PSA) 109, is encapsulated and triggered in a separate process by the daemon framework. Although a call 111 is made asynchronously, the daemon waits for the return of the call. An abnormal ending of this functionality is identified by the release of the integrity lock obtained when functionality is started in a separate process.

Accordingly, FIG. 1 shows an operational scenario in which a user may take action 110 to implement calls 111 to functionalities that the user seeks to control by the daemon framework 108. In customizing the system, the user defines what daemon(s) are to be run in the system, and what is their sequence.

First, a user starts a main (controller) daemon 120 of the daemon framework 102. This main (controller) daemon starts all customized daemons, e.g. Daemon 1 122 and Daemon 2 124 in FIG. 1A. One child daemon detects data in the pre-configured inbound folders, while another child daemon detects data deliveries in the pre-configured service PSA. This functionality could also be extended to the dispatcher of the Process Flow Controller (PFC) for the processing of data.

In FIG. 1A, the "C" scroll 121 represents a health check functionality inherited from the default implementation 128. This health check functionality provides "retry in case of error" and "restart after outage" functionality from the default implementation.

FIG. 1 shows the cycle of processing, wherein after each cycle each daemon checks its "expected" status for consistency and behaves according to it. This allows full control by the controller daemon (or functionalities added by a user other than a default implementation).

Thus the daemon checks that it is unique, in the event that the previous run is not completed yet. The controller daemon checks that all daemons are scheduled properly (including itself).

The controller daemon also controls 127 the child daemons. For example, the controller daemon manages the lifecycle 126 of the child daemons. An example of daemon lifecycle management is provided below in connection with the example.

The controller daemon may also manages child daemon status 128. An example of daemon status management is also provided below in connection with the example.

The controller daemon may also react to health checks 129. Such health checks have been described, and may be inherited from the default implementation.

In the action 110, the daemon executes third party application functionality independently in a separate task. For example, a child daemon of FIG. 1A may automatically detect delivery of data threads for processing by a process flow controller of a load management application.

In particular, the controller daemon may manage a first child daemon 122 to perform a first application 123 that automatically checks to see if there are files dropped in a folder. The controller daemon may manage a second child daemon 124 to perform a second application 125 that automatically checks to see if there are particular entities in a PSA of a business intelligence system.

A motivation behind such automated functionality is its repetitive nature. In particular, embodiments may allow automation of periodic detection of data deliveries—'complete' deliveries that are marked 'ready' to be processed by the Process Flow Controller for processing of detected data.

A user thus implements applications functionality (Application 1 to detect files in the file system, and Application 2 to detect data in the tables) using the interface (or abstract class—depending upon the language of realization) provided by daemon framework. In a particular embodiment, the user may customize the Daemon 1 to start once an hour and run application functionality every five minutes, and customize the Daemon 2 to start once a day and run application functionality every ten minutes In action 112, the daemon waits for the functionality to return. In the particular circumstances of the Example described below, the daemon waits for the results of scanning of the application folder and/or PSA for new data deliveries.

In action 114, the daemon executes a built-in health check. A typical scenario comprises the still-running daemon to execute the health check. In a default implementation 128, for the controller daemon the health check may indicate that one or more of the child daemons 122, 124 are supposed to be running (and may even be reported as running), but they are not. In such case, the controller daemon may function to start the child daemons.

While FIG. 1A shows a default implementation wherein the health check functionality causes the controller daemon to check on and start operation of child daemon(s), this is simply one possible embodiment. According to alternative embodiments other functionality pursuant to the health check action, could be added by a user.

In particular embodiments, it may not be the responsibility of child daemon to trigger other daemons directly. Thus for a daemon other than the main (controller) daemon, the health check may serve to trigger that main daemon if it is not already running.

As a result of the health check being performed, if no problems are detected, the main daemon will again be running in one cycle. In two cycles, all of the daemons will again be running.

Following the health check action, the daemon sleeps until a next application execution time. If the daemon's scheduled time is over, the daemon expires.

EXAMPLE

Figure 2:
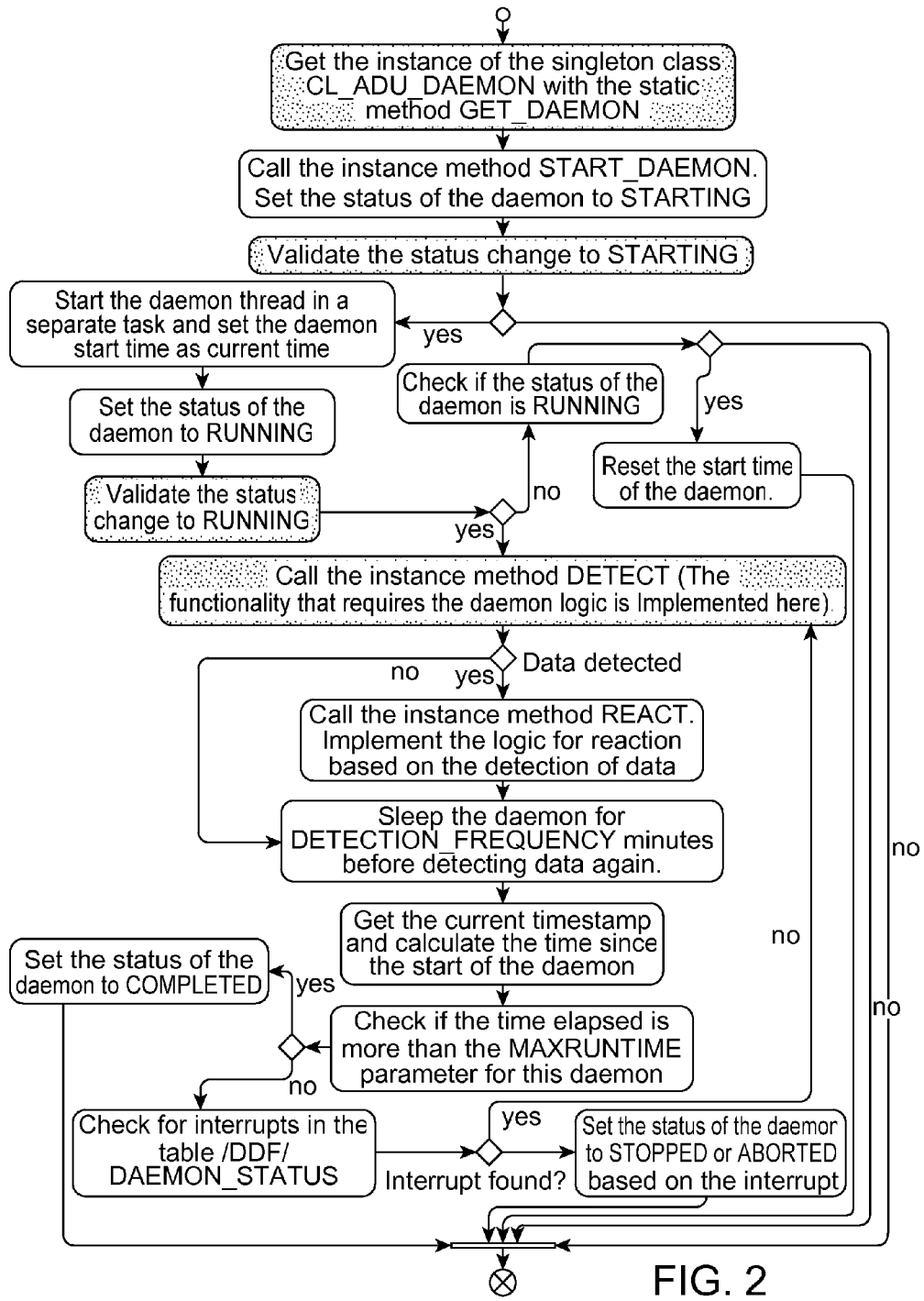
FIG. 2 shows a process flow according to an embodiment.
Figure 2A:
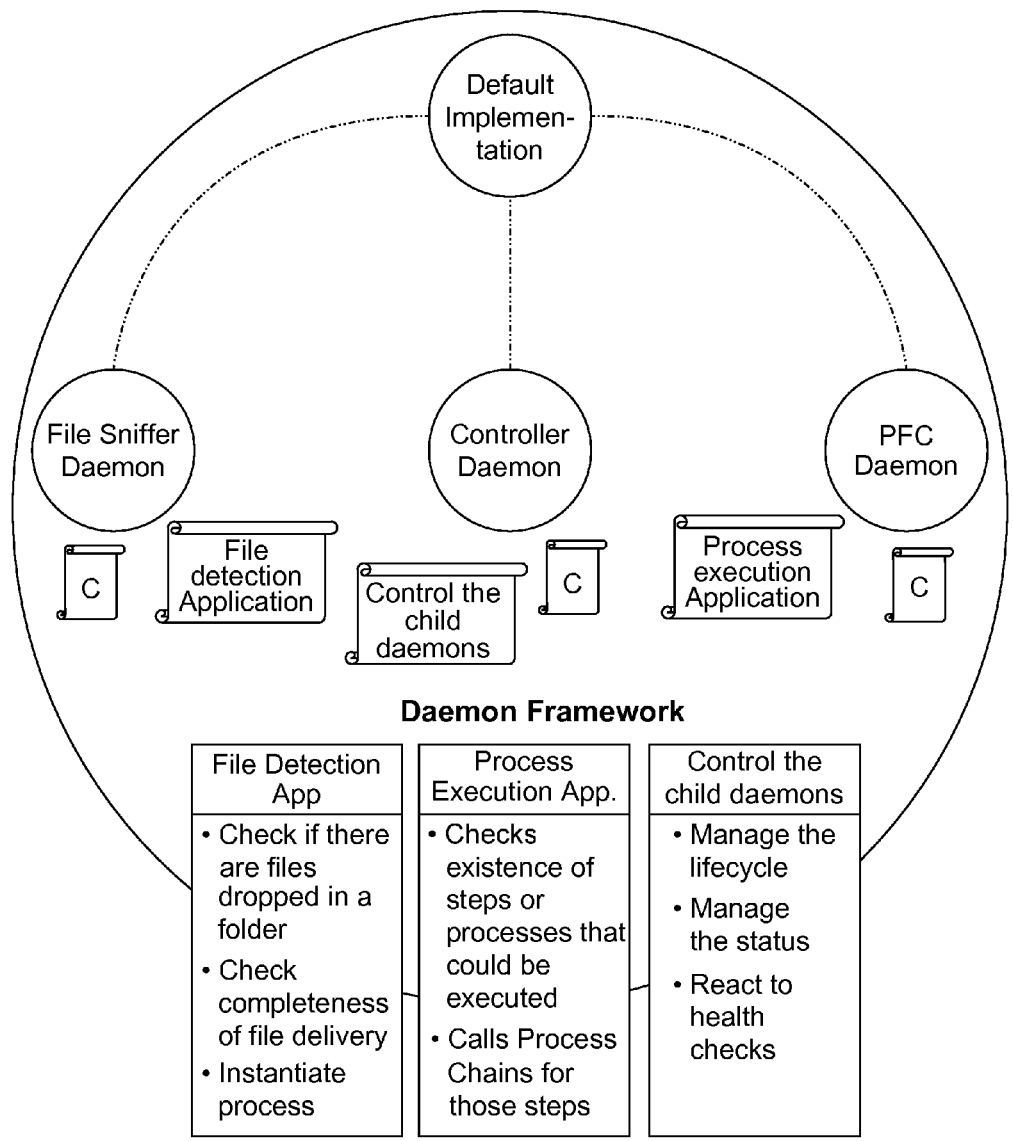
FIG. 2A shows an enlarged view of an embodiment of the daemon framework according to an example.

FIG. 2 is a simplified process flow showing operation of an example of a daemon framework. FIG. 2A shows an enlarged view of an embodiment of the daemon framework according to this example. Here, the daemon framework is configured to perform thread scheduling and control for a load management application.

This daemon framework may employ two child daemons in conjunction with the main (controller) daemon. Again, the controller daemon is configured to control child daemons by managing lifecycle, by managing status, and by reacting to health checks.

One child daemon—the File Sniffer Daemon—relates to file detection. This child daemon checks to see if there are files dropped in a folder. This child daemon also checks for the completeness of file delivery, and instantiates the process.

Another child daemon—the PFC Daemon—relates to process execution. This child daemon checks the existence of steps or processes that could be executed. It calls process chains for those steps.

The processing environment for this example is summarized in the following table:

| Daemon | Task | Application |
|---|---|---|
| Controller | Manages the scheduling, statuses, and life cycle of the daemons defined in the framework. | Daemon Framework |
| File Sniffer | Detecting filed dropped in folder; check completeness of file delivery; instantiate process. | File Detection |
| PFC | Check for existence of steps or processes; call process chains for those steps. | Process Execution |
| Dispatcher | Detecting deliveries that are to be processed and triggering the actual extraction and processing of data by the Process Flow Controller (PFC) | Process Flow Controller |

A daemon can be instantiated according to the singleton pattern, using a class factory to manage the live instances. Here, the singleton class CL_ADU_DAEMON is used.

The singleton pattern allows only single instantiation of an object per process. However, as the daemon would run in multiple processes, the single instance is ensured by the daemon status table (see below) and the ENQUEUE mechanism.

The following table shows daemon customizing according to this example:

| DAEMON_ID | 0001 | 0010 | 0020 | 0030 |
|---|---|---|---|---|
| MAXRUNTIME | 01 | 01 | 01 | 01 |
| SCHEDULED_STARTTIME | 17:00:00 | 17:00:00 | 17:00:00 | 17:00:00 |
| SCHEDULED_PERIOD | 01 | 01 | 02 | 01 |
| IMPL_CLASSNAME | /DDF/CL_ADU_DAEMON | /DDF/CL_LM FSNIF_DAEMON | /DDF/CL_PFC DSNIF_DAEMON | /DDF/CL_PFC DISPH_DAEMON |
| DETECTION_FREQUENCY | 1 | 1 | 1 | 1 |

The following table shows daemon scheduling according to this example.

| DAEMON_ID | 0001 |
|---|---|
| MAXRUNTIME | 01 |
| SCHEDULED_STARTTIME | 17:00:00 |
| SCHEDULED_PERIOD | 01 |
| IMPL_CLASSNAME | /DDF/CL_ADU_DAEMON |
| DETECTION_FREQUENCY | 1 |

The following table shows daemon lifecycle management in this example.

| Status | Daemon Alive | Action |
|---|---|---|
| NEW, SCHEDULED, COMPLETED, STOPPED | Yes | Status changed to ABORTING so that the runaway daemon will pick this up, quit, and change the status to ABORTED |
| NEW, SCHEDULED, COMPLETED, STOPPED | No | No Action |
| STARTED, RUNNING, STOPPING, ABORTED | Yes | No Action |
| STARTED, RUNNING, STOPPING, ABORTED | No | Set the status to ABORTED as the daemon is already dead. |
| STARTING | Yes | No Action. |
| STARTING | No | No Action. |

The following table illustrates daemon status management in this example.

| Daemon Status | Description | Status can be changed to: |
|---|---|---|
| NEW (0001) | When the status is reset or when a new daemon is created in the system. | STARTING, SCHEDULED, ABORTED |
| STARTING (0010) | Just before the daemon is started in a new task. | STARTED, RUNNING, ABORTED |
| STARTED (0020) | After the daemon has started in a new task (e.g. to set the initial status of the detection) | STOPPING, ABORTING, ABORTED |
| SCHEDULED (0030) | When jobs are scheduled, the SCHEDULED_STARTTIME is set to the future time when the daemon will start. | STARTING, NEW, ABORTED |
| RUNNING (0040) | After the daemon has started in a new task, if the previous status was STARTING. | COMPLETED, STOPPING, ABORTING, ABORTED |
| COMPLETED (0045) | When the daemon completes the time specified by the MAXRUNTIME parameter in customizing. | NEW, STARTING, ABORTED |
| STOPPING (0050) | Interrupt. This is the manual interrupt provided to stop the daemon. | STOPPED |
| STOPPED (0060) | On receiving the interrupt STOPPING, the daemon sets the status to STOPPED and quits. A stopped daemon has to be started manually. | NEW |
| ABORTING (0070) | Interrupt. This is the system interrupt to stop processing of the daemon. | ABORTED |
| ABORTED (0080) | Exceptions from the application program on the interrupt ABORTING causes the daemon to set the status to ABORTED just before quitting. An aborted daemon will be started automatically | NEW, STARTING |

The daemon framework may include but is not limited to the following functionalities. One functionality of the daemon framework, may be to start and stop the daemon manually and automatically. Manual stopping of the daemon will pause the functionality implemented by the daemon. For example, stopping the file-sniffer daemon will stop the files from being detected and processed.

Another functionality of the daemon framework may be to abort/kill the processing with error logging. A daemon is aborted programmatically when there is an exception. Once an exception is raised, a manual intervention is necessary. Once the root cause has been tackled, the daemon could be reset.

Another functionality of the daemon framework may be to start the daemon automatically in period that can be configured. The daemon can be configured to be started periodically in hourly intervals. The daemon schedules a background job to achieve this functionality. In addition to the functionality of starting resource consuming recursive activity during low usage hours of the system, this functionality also ensures that the daemon will start in case there are failures in the previous run of the functionality.

Another functionality of the daemon framework according to some embodiments, may be to detect data recursively, and react if data is detected. Implementation of detect functionality of a daemon could include activity that re-triggers detect method of the same (or other) daemon. For example, a daemon that creates an application thread each time that entry is found in a table, could create a new entry in the same table under certain circumstances.

Still another functionality of the daemon framework according to certain embodiments, may be to allow single instantiation within an application server. In this manner, it is ensured that there will always be only one instance of the configured daemon running per system.

Yet another functionality of the daemon framework according to various embodiments, may be to configure the application to run using the background job scheduler. Even though this report can be run outside the daemon framework, it ensures that there will be only a single instantiation of the application throughout the system landscape.

Thus based on the above, implementing a functionality within the daemon framework may ensure that functionalities may also be inherited.

Thread control processes according to various embodiments may offer certain benefits. For example, some embodiments may offer the possibility of scheduling a main process of the framework, as well as other processes.

Another possible benefit offered by certain embodiments, may be automatic error correction with re-spawn capabilities, so long as system has available resources. A controller daemon could re-schedule job if there is no job scheduled. This could be implemented by customization, and other system-specific measures could be added to the framework.

While the above description has focused upon a daemon framework that is configured to operate automatically, other embodiments are possible. For example, one approach is to schedule a program in specified time intervals. This would minimize system resources and ensure that no matter the status of the previous run of the program, unless programmatically specified a new instance will always start. Such an approach, however, may not offer real-time detection of the delivered data, as the delivered data will wait for the next scheduled run of the program.

Another approach may rely upon a program running continuously in the background and having one or more of the following properties:
  real-time detection of the delivered data;
  no autostarting features in case the daemon dies of uncontrolled circumstances, e.g. unplugging of the application server in which the daemon is running;
  a background process in use.

Still another approach may schedule a daemon that can be configured to run for a specified time interval at regular intervals. Such an embodiment may be configurable with an SAP Product Reference Object (SPRO).

Regardless of the status of the daemon run previously, unless programmatically specified, in such an embodiment a new instance will start.

According to this type of embodiment, near real-time detection of delivered data may be allowed. Depending upon the configured time limit, the delivered data will not have to wait for a long time.

Embodiments of this type may also offer the possibility to schedule the daemon to run during the least usage period of the system.

Embodiments of this type may further offer the possibility to use only the job scheduler, over-riding the daemon framework, but still ensuring that only one instance of the daemon will run throughout the distributed shared memory (DSM) system landscape.

A daemon that terminates of an uncontrolled and unforeseen circumstance in an embodiment of this type, will have a status 'ABORTED' and an exception will be logged. Only one instance of the daemon will run at any given point of time in a system. Such embodiments may offer easy manual starting and restarting possible from a single screen. With UI technologies, it may be possible to control the properties of DSM data load from remote locations using a web browser.

Figure 3:
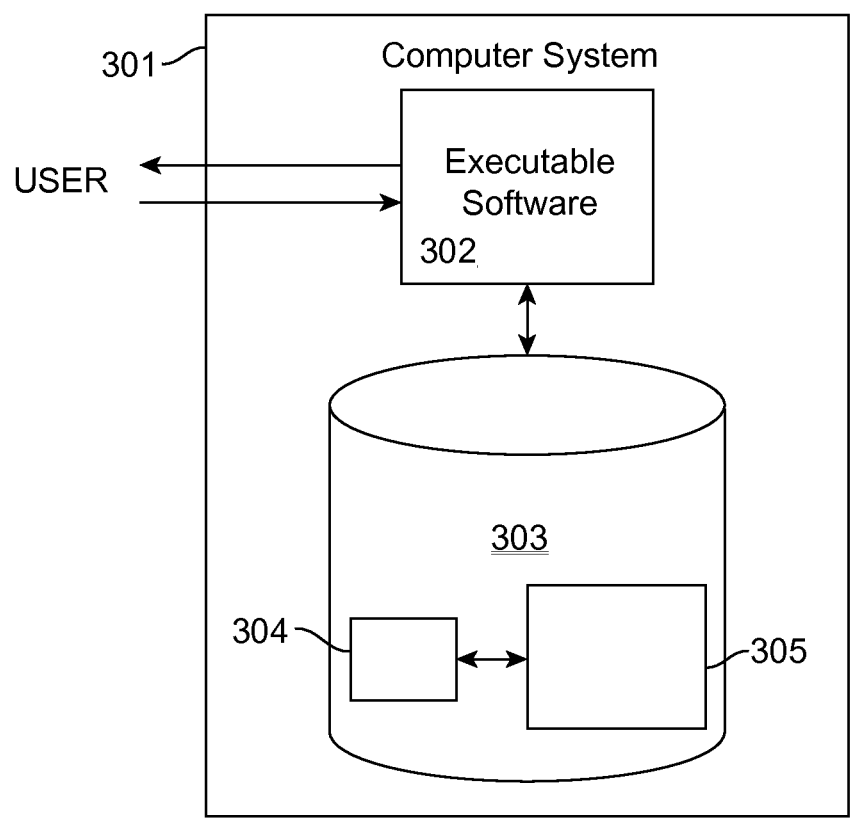
FIG. 3 illustrates hardware of a special purpose computing machine configured to perform thread control scheduling and control according to an embodiment.

FIG. 3 illustrates hardware of a special purpose computing machine configured to perform thread scheduling and control according to an embodiment. In particular, computer system 300 comprises a processor 302 that is in electronic communication with a non-transitory computer-readable storage medium 303. This computer-readable storage medium has stored thereon code 305 corresponding to a main (controller) daemon. Code 304 corresponds to a child daemon. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 4:
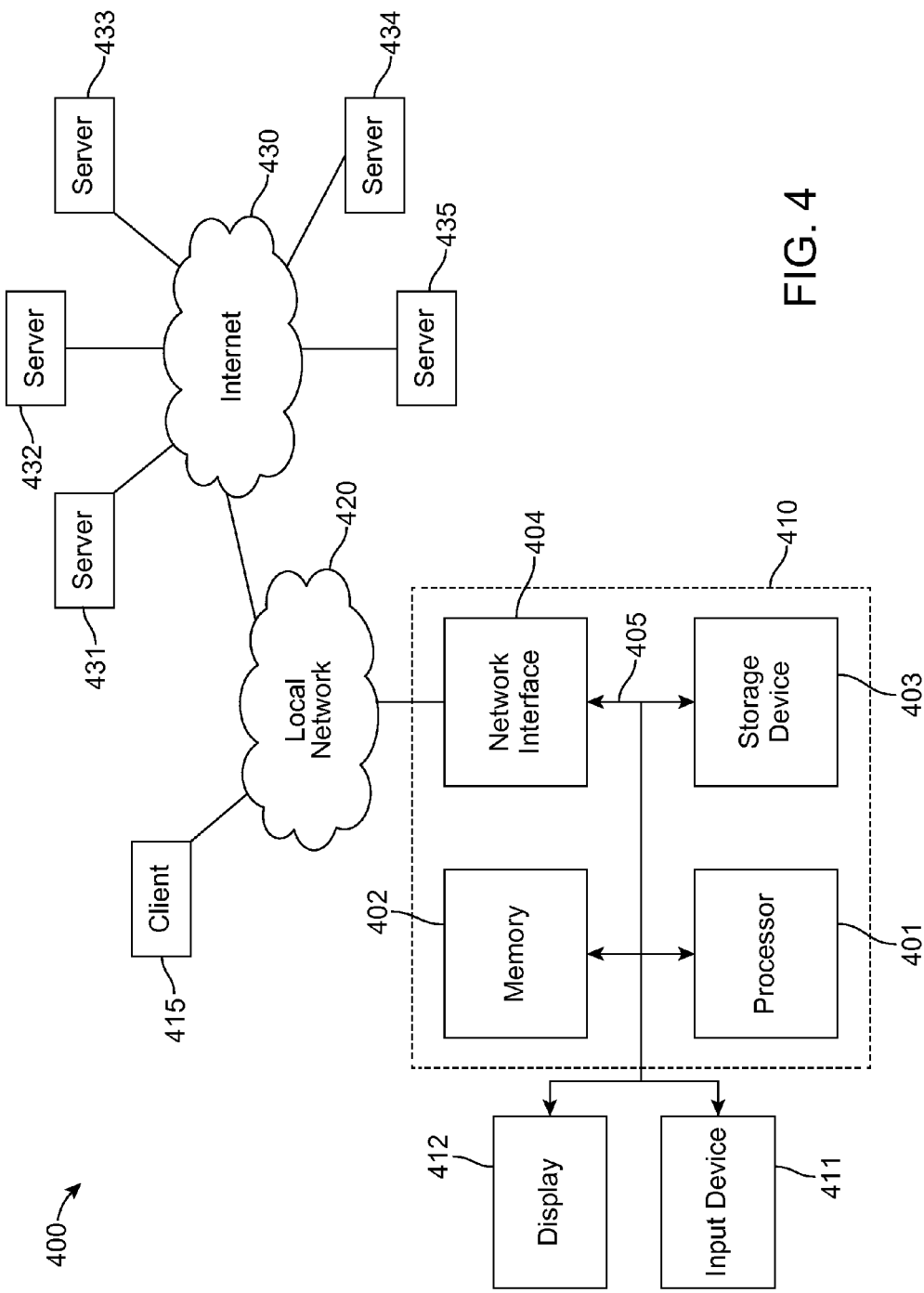
FIG. 4 illustrates an example of a computer system.

An example computer system 410 is illustrated in FIG. 4. Computer system 410 includes a bus 405 or other communication mechanism for communicating information, and a processor 401 coupled with bus 405 for processing information. Computer system 410 also includes a memory 402 coupled to bus 405 for storing information and instructions to be executed by processor 401, including information and instructions for performing the techniques described above, for example. This memory may also be used for storing variables or other intermediate information during execution of instructions to be executed by processor 401. Possible implementations of this memory may be, but are not limited to, random access memory (RAM), read only memory (ROM), or both. A storage device 403 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 403 may include source code, binary code, or software files for performing the techniques above, for example. Storage device and memory are both examples of computer readable mediums.

Computer system 410 may be coupled via bus 405 to a display 412, such as a cathode ray tube (CRT) or liquid crystal display (LCD), for displaying information to a computer user. An input device 411 such as a keyboard and/or mouse is coupled to bus 405 for communicating information and command selections from the user to processor 401. The combination of these components allows the user to communicate with the system. In some systems, bus 405 may be divided into multiple specialized buses.

Computer system 410 also includes a network interface 404 coupled with bus 405. Network interface 404 may provide two-way data communication between computer system 410 and the local network 420. The network interface 404 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 404 sends and receives electrical, electromagnetic, or optical signals that carry digital data streams representing various types of information.

Computer system 410 can send and receive information, including messages or other interface actions, through the network interface 404 across a local network 420, an Intranet, or the Internet 430. For a local network, computer system 410 may communicate with a plurality of other computer machines, such as server 415. Accordingly, computer system 410 and server computer systems represented by server 415 may form a cloud computing network, which may be programmed with processes described herein. In the Internet example, software components or services may reside on multiple different computer systems 410 or servers 431-435 across the network. The processes described above may be implemented on one or more servers, for example. A server 431 may transmit actions or messages from one component, through Internet 430, local network 420, and network interface 404 to a component on computer system 410. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:

providing a daemon framework comprising a controller daemon and a child daemon;

causing the controller daemon to manage a status of the child daemon to start periodically during low usage hours according to a background job schedule and automatically scan for delivery of a data thread to a process flow controller (PFC) in a recursive manner;

wherein prior to managing a status of the child daemon, the controller daemon is configured to check a status of the child daemon for consistency;

wherein prior to checking the status of the child daemon for consistency, the controller daemon is configured to determine a uniqueness lock;

causing the controller daemon to perform a health check to determine operation of the child daemon; and where the health check indicates that the child daemon is not running, causing the controller daemon to start the child daemon.

2. A method as in claim 1 wherein the data thread is delivered to an application folder.

3. A method as in claim 1 wherein the data thread is delivered to a persistent staging area.

4. A method as in claim 1 wherein the child daemon is instantiated according to a singleton pattern using a class factory to manage live instances.

5. A method as in claim 1 wherein the controller daemon may manage a status of the child daemon to be manually interrupted.

6. A non-transitory computer readable storage medium embodying a computer program for performing a method, said method comprising:
providing a daemon framework comprising a controller daemon and a child daemon;
causing the controller daemon to manage a status of the child daemon to start periodically during low usage hours according to a background job schedule and automatically scan for delivery of a data thread to a process flow controller (PFC) in a recursive manner;
wherein prior to managing a status of the child daemon, the controller daemon is configured to check a status of the child daemon for consistency;
wherein prior to checking the status of the child daemon for consistency, the controller daemon is configured to determine a uniqueness lock;
causing the controller daemon to perform a health check to determine operation of the child daemon; and
where the health check indicates that the child daemon is not running, causing the controller daemon to start the child daemon.

7. A non-transitory computer readable storage medium as in claim 6 wherein the data thread is delivered to an application folder.

8. A non-transitory computer readable storage medium as in claim 6 wherein the data thread is delivered to a persistent staging area.

9. A non-transitory computer readable storage medium as in claim 6 wherein the child daemon is instantiated according to a singleton pattern using a class factory to manage live instances.

10. A non-transitory computer readable storage medium as in claim 6 wherein the controller daemon may manage a status of the child daemon to be manually interrupted.

11. A computer system comprising:
one or more processors;
a software program, executable on said computer system, the software program configured to:
provide a daemon framework comprising a controller daemon and a child daemon;
cause the controller daemon to manage a status of the child daemon to start periodically during low usage hours according to a background job schedule and automatically scan for delivery of a data thread to a process flow controller (PFC) in a recursive manner;
wherein prior to managing a status of the child daemon, the controller daemon is configured to check a status of the child daemon for consistency;
wherein prior to checking the status of the child daemon for consistency, the controller daemon is configured to determine a uniqueness lock;
cause the controller daemon to perform a health check to determine operation of the child daemon; and
where the health check indicates that the child daemon is not running, cause the controller daemon to start the child daemon.

12. A computer system as in claim 11 wherein the data thread is delivered to an application folder.

13. A computer system as in claim 11 wherein the data thread is delivered to a persistent staging area.

14. A computer system as in claim 11 wherein the child daemon is instantiated according to a singleton pattern using a class factory to manage live instances.

15. A computer system as in claim 11 wherein the controller daemon may manage a status of the child daemon to be manually interrupted.

* * * * *